(12) United States Patent
McKown et al.

(10) Patent No.: US 8,359,741 B2
(45) Date of Patent: Jan. 29, 2013

(54) METHOD OF MACHINING BEARING CAPS AND HOLDING FIXTURE

(75) Inventors: Jeffrey A. McKown, Rochester, MI (US); Richard T. Najarian, Birmingham, MI (US)

(73) Assignee: Fettes Manufacturing Co., Sterling Heights, MI (US)

( * ) Notice: Subject to any disclaimer, the term of this patent is extended or adjusted under 35 U.S.C. 154(b) by 0 days.

(21) Appl. No.: 12/813,623

(22) Filed: Jun. 11, 2010

(65) Prior Publication Data

US 2010/0252974 A1 Oct. 7, 2010

Related U.S. Application Data

(62) Division of application No. 11/855,387, filed on Sep. 14, 2007, now Pat. No. 7,765,662.

(60) Provisional application No. 60/844,584, filed on Sep. 14, 2006.

(51) Int. Cl.
*B25B 5/16* (2006.01)

(52) U.S. Cl. ........ 29/888.09; 29/898; 29/27 C; 269/900; 269/902; 269/910

(58) Field of Classification Search ............... 29/888.09, 29/27 C, 898, 558, 557; 269/900, 902, 910, 269/290, 291, 139, 53, 48.1
See application file for complete search history.

(56) References Cited

U.S. PATENT DOCUMENTS

| | | | |
|---|---|---|---|
| 4,642,005 A | 2/1987 | Kondo et al. | |
| 4,645,391 A | 2/1987 | Fallert | |
| 4,789,279 A | 12/1988 | Rottler et al. | |
| 4,860,419 A | 8/1989 | Hekman | |
| 5,568,891 A * | 10/1996 | Hoag et al. | 225/93 |
| 5,941,515 A * | 8/1999 | Salow | 269/265 |
| 6,817,505 B2 * | 11/2004 | Hahnel et al. | 225/2 |
| 7,044,291 B1 * | 5/2006 | Mumford | 206/81 |
| 2005/0126533 A1 * | 6/2005 | Iwasaki et al. | 123/197.3 |

* cited by examiner

*Primary Examiner* — David Bryant
*Assistant Examiner* — Christopher Besler
(74) *Attorney, Agent, or Firm* — John A. VanOphem; Bejin, VanOphem & Bieneman. PLC

(57) ABSTRACT

A method of manufacturing a bearing cap is disclosed using a fixture that has a mandrel that is received in the bearing bore and clamps that engage the outer surface of the bearing caps. A pair of bolt shoulders of the bearing caps are machined and a bolt hole is drilled in each of the bolt shoulder portions. The bearing bores are subsequently machined with the bearing caps being located based upon the location of the bolt holes to form a plurality of finished bearing caps. A holding fixture is disclosed for machining bearing caps that have a generally semi-cylindrical bearing bore on an interior surface and bolt shoulders on opposite sides that are drilled to receive bolts. The holding fixture comprises a fixture frame to which a mandrel is attached that receives the bearing caps with the bearing bore centered relative to the mandrel. A plurality of clamps engage an exterior portion of the bearing caps to retain the bearing caps on the mandrel.

3 Claims, 5 Drawing Sheets

METHOD OF MACHINING BEARING CAPS AND HOLDING FIXTURE

CROSS-REFERENCE TO RELATED APPLICATIONS

This application is a division of U.S. application Ser. No. 11/855,387 filed Sep. 14, 2007, now U.S. Pat. No. 7,765,662, issued Aug. 3, 2010, which claims the benefit of U.S. provisional application Ser. No. 60/844,584 filed Sep. 14, 2006.

BACKGROUND OF THE INVENTION

1. Field of the Invention

The present invention relates to methods of machining wheel bearing caps or other bearing caps in a CNC work center.

2. Background Art

Bearing caps are used to secure a bearing that journals a shaft. Bearing caps are used in vehicles to retain axle shafts within an axle and wheel bearings for a wheel assembly. Bearing caps may also be provided to retain crankshaft bearings on an engine and may also be used in other types of machinery. Bearing caps generally have a semi-circular body portion and flanges for receiving bolts that are used to secure the bearing cap to a supporting member or second part of a bearing retaining assembly. Bearing caps must be machined to close tolerances to avoid assembly problems and excessive scrap and salvage expense.

Bearing caps may be formed in a casting operation in which tolerances are typically required to be held to ±0.030 inches for castings having a distance between measured points of between 0 and 3 inches and ±0.045 between 3 and 8 inches. Castings are normally formed with a draft angle that is required to remove the casting from the casting mold. The unusual shape of a bearing cap makes it difficult to properly fixture one or more bearing caps as they are machined.

Bearing caps normally must be machined after casting to provide uniformity from part to part. For example, at one machining center location, a bearing cap may be fixtured while bolt holes are drilled and counterbored on the fastener shoulders of the bearing cap with the end faces of the bearing cap being milled to a tolerance of ±0.010 inches.

The relatively broad tolerance for a cast bearing cap is three times the tolerance allowed for machining surfaces which makes it difficult to fixture cast bearing caps for initial machining operations. After initial machining operations are performed on the bearing cap, accurately machined surfaces are available to locate the bearing cap for subsequent machining operations.

There is a need for a method of machining a plurality of bearing caps simultaneously at a work center that allows the bolt hole locations and machined surfaces to be accurately located. The above problems and needs are addressed by Applicant's invention as summarized below.

SUMMARY OF THE INVENTION

According to one aspect of the disclosure, a method is disclosed for manufacturing bearing caps using an improved fixture for "as cast" parts. A rough bearing cap is cast in a mold that has an as cast semi-cylindrical bearing bore and an outer surface. A plurality of bearing caps are assembled into a first fixture that has a mandrel that is received in the bearing bore. The bearing caps are assembled onto the first fixture with clamps that engage the outer surface of the bearing caps. A pair of bolt shoulder portions of the bearing caps are machined and a bolt hole is drilled into each bolt shoulder portion. The bearing caps are removed from the first fixture and are subsequently machined while being located using the bolt holes to form the finished bearing caps.

The method assures that the bearing bore is centered relative to the flange area of the bearing cap. Off-center bearing bores can create issues relating to the wall thickness and potential weaknesses in the structure of the bearing cap.

According to another aspect of the invention, a holding fixture for a bearing cap is centered relative to a generally semi-cylindrical surface of the rough "as cast" part. The generally semi-cylindrical surface may be the bearing bore of a bearing cap. The bearing bore engages a mandrel of the holding fixture that has a center that corresponds to the center of the bearing to be retained by the bearing cap. Clamps engage the outer surface of the fixtured bearing cap to retain them on the mandrel. The bolt holes and machined surfaces are located relative to the partially cylindrical surface corresponding to the inner bore of the bearing cap that receives the bearing.

According to another aspect of the invention, a holding fixture for machining a bearing cap is provided that permits a plurality of bearing caps to be fixtured relative to the cast radiused ends of the bearing cap. Floating V-blocks that are pivotable and shiftable may, in one embodiment, locate the ends of the bearing cap. The floating V-blocks may be spring loaded to move up and down and pivot to compensate for draft angle and cast part tolerances. The floating V-blocks facilitate loading and also increase uniformity part-to-part for machining operations.

According to other aspects of the present invention, the bearing caps are retained by clamping plates that lock the bearing cap into the holding fixture prior to performing the desired machining operations. The clamping plates locate the bearing caps in the fixture at predetermined locations, and in particular, hold the bearing caps on the semi-circular central cast radius at the desired circumferential orientation relative to the mandrel.

These and other features and advantages will be better understood in view of the attached drawings and following detailed description of the illustrated embodiment of the invention.

DETAILED DESCRIPTION OF THE PREFERRED EMBODIMENT(S)

Figure 1:
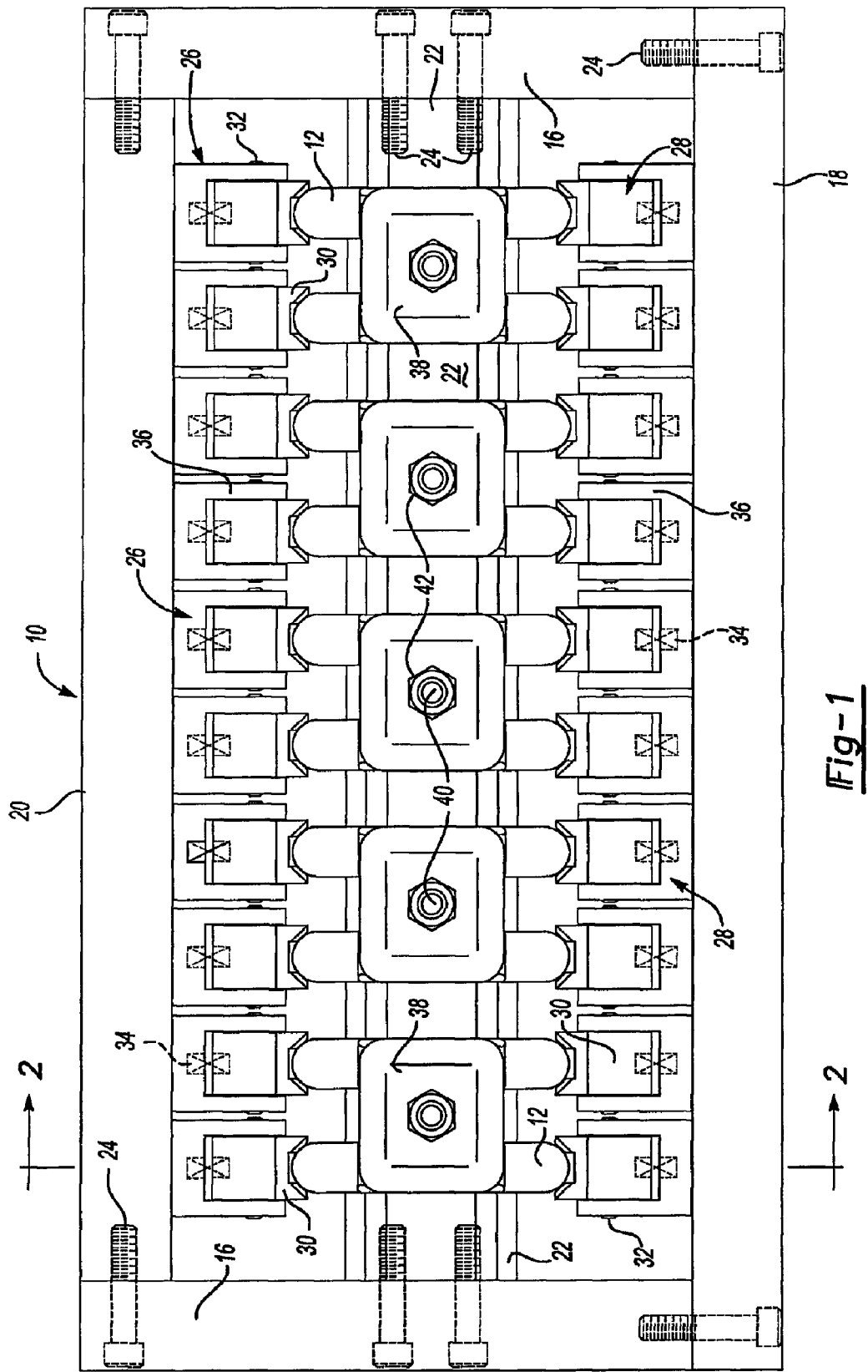
FIG. 1 is a front elevation view of a fixture for machining bearing caps in a CNC work center shown with the bearing cap clamped in the fixture according to one embodiment of the present invention.

Referring to FIG. 1, a fixture 10 for retaining a plurality of bearing caps 12 is shown with ten bearing caps assembled to the fixture 10. The fixture 10 includes two side plates 16, a base plate 18 and a top plate 20. The fixture 10 is generally in the form of an open frame that permits machining operations to be performed on two sides of the bearing caps 12 while assembled to the fixture 10. A mandrel 22 extends between the side plates 16 and parallel to the base plate 18 and top plate 20. The plates and mandrel of the frame are assembled together by dowel pins (not shown) and socket head screws 24.

An upper floating V-block assembly 26 is assembled to the top plate 20 of the fixture 10. A lower V-block clamp assembly 28 is assembled to the base plate 18 of the fixture 10. Each of the V-block assemblies 26, 28 include a jaw 30 that is mounted on a pin 32. A spring 34 resiliently biases the jaw 30 relative to a V-block retainer 36. The pin 32 is journalled within the V-block retainer 36 to support the jaw 30 in a movable relationship relative to the V-block retainer 36.

A tie-down bolt 40 and nut 42 are used to secure a mandrel clamp 38. The tie-down bolt 40 extends through the mandrel 22 between two adjacent bearing caps 12 so that a single clamp 38 may be used to simultaneously engage the two adjacent bearing caps 12 and to retain two bearing caps 12 simultaneously onto the fixture 10.

Figure 2:
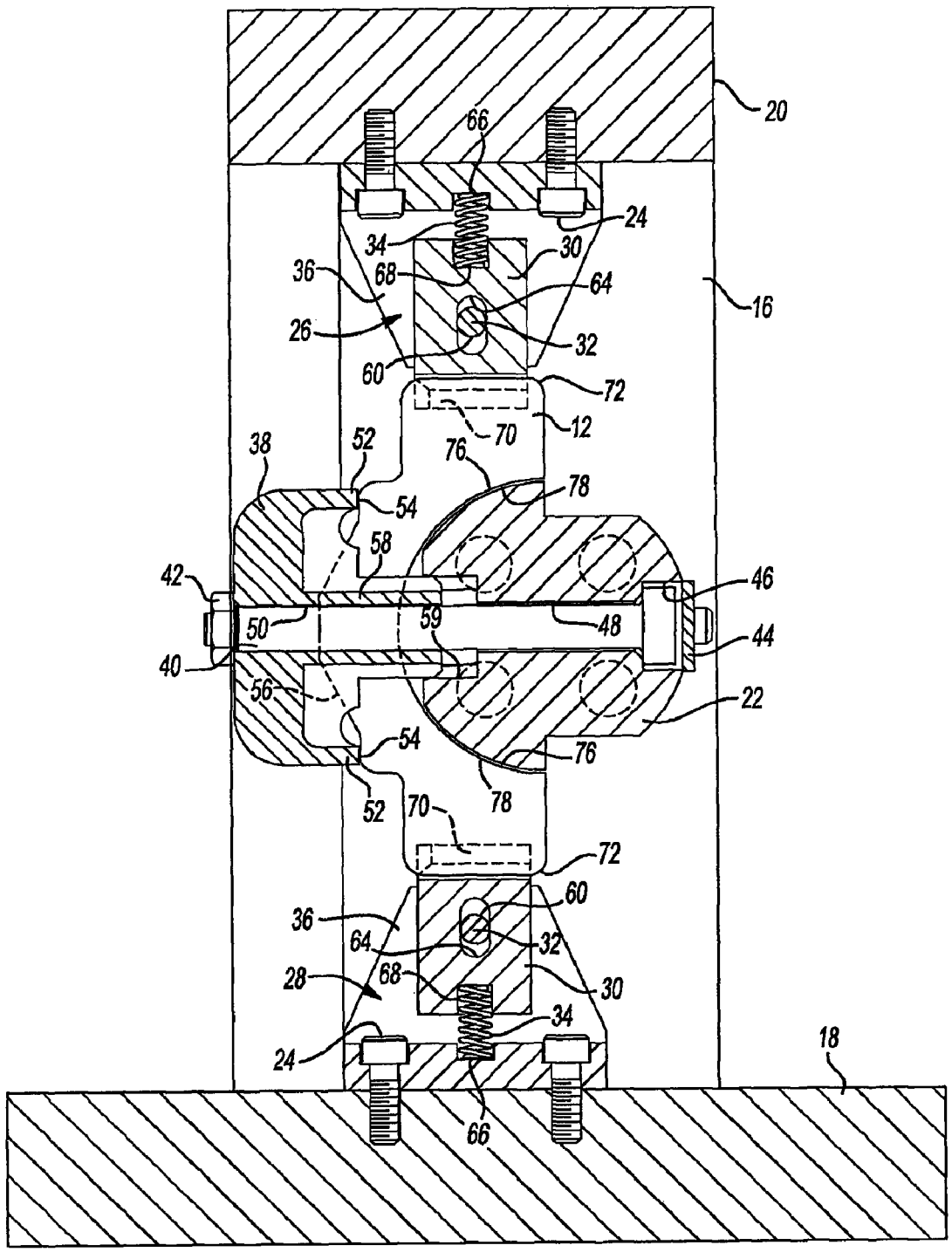
FIG. 2 is a cross-sectional view taken along the line 2-2 in FIG. 1.
Figure 3:
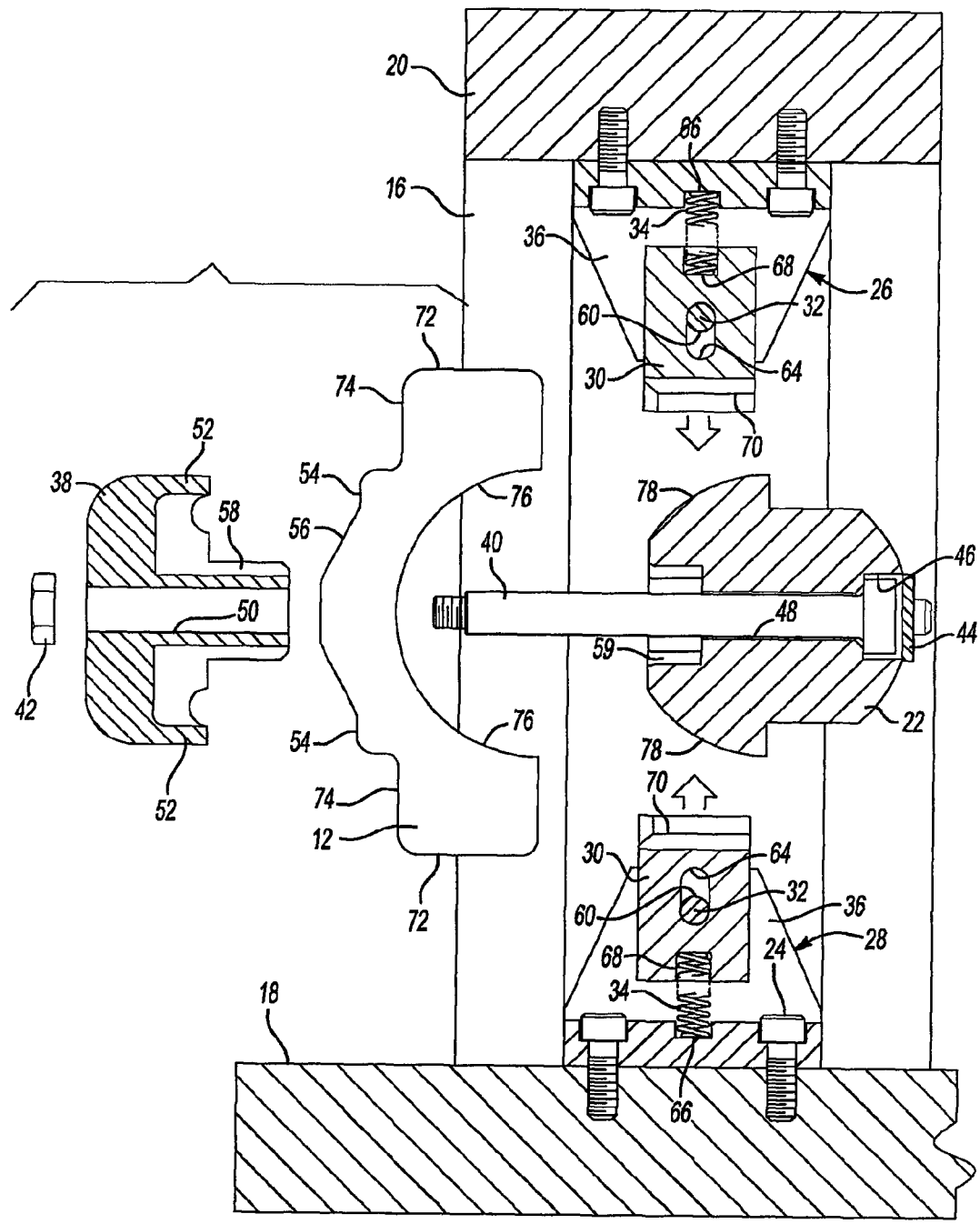
FIG. 3 is a cross-sectional view similar to FIG. 2 showing a bearing cap prior to assembly to the fixture.

Referring to FIGS. 2 and 3, the relationship of the bearing cap 12, mandrel 22 and upper and lower V-block assemblies 26, 28 is illustrated. The mandrel 22 is secured between the side plates 16. The tie-down bolt 40 is retained by a backing plate 44 that holds the tie-down bolt 40 securely within the bolt head receptacle 46. The bolt head receptacle 46 is configured to receive the head of the tie-down bolt 40 in a non-rotational relationship. The tie-down bolt 40 is received in a bolt hole 48 formed in the mandrel 22. The tie-down bolt 40 is also received in a central opening 50 of the mandrel clamp 38. Mandrel clamp 38 includes locating fingers 52 that engage a step 54 that is formed on a reinforcing rib 56 of the bearing cap 12. A tubular extension 58 is formed on the mandrel clamp 38 and is received in a clamp receptacle opening 59. The clamp receptacle opening 59 may have a polygonal configuration, such as a square that locates the clamp 38 in a non-rotative manner.

A pin receptacle 60 is provided in the V-block retainer 36 which receives the pin 32 and holds the pin 32 stationary relative to the V-block retainer 36. A slot 64 is provided in the jaw 30. The slot is elongated in the vertical direction. The term "vertical direction" as used herein is the direction defined by a line that extends perpendicular to the base plate 18 and top plate 20. The jaw 30 receives the pin 32 in the slot 64 so that the jaw 30 may move vertically and pivot relative to the V-block retainer 36. The spring 34 is received in a spring seat 66 formed in the V-block retainer 36 and a spring receptacle 68 formed in the jaw 30. The spring 34 biases the jaw 30 towards the mandrel 22.

A locating face 70 of the jaw 30 is oriented to engage an outer surface 72 of the bearing cap 12. The outer surface 72 is formed with a draft angle in the casting process in which the bearing cap 12 is initially cast. The jaw 30 is pivotable relative to the V-block retainer 36 and is also vertically movable relative to the V-block retainer 36 to accommodate variations as a result of normal tolerances in the size and shape of the bearing cap 12.

When the bearing cap 12 is fixtured, the bearing cap is engaged by the upper V-block assembly 26 and the lower V-block assembly 28 that retain the bearing cap relative to the mandrel 22 with the bearing bore 76, as cast, engaging cylindrical surfaces 78 that are formed on the mandrel 22. After the bearing cap 12 is positioned between the upper and lower V-block assemblies 26, 28 and the mandrel 22, the mandrel clamp 38 is placed on the tie-down bolt with the locating fingers 52 engaging the steps 54 of the bearing cap 12. The nut 42 is then used to secure the mandrel clamp 38 to the tie-down bolt 40. The tubular extension 58 of the mandrel clamp 38 is received in the clamp receptacle opening 59.

Figure 4:
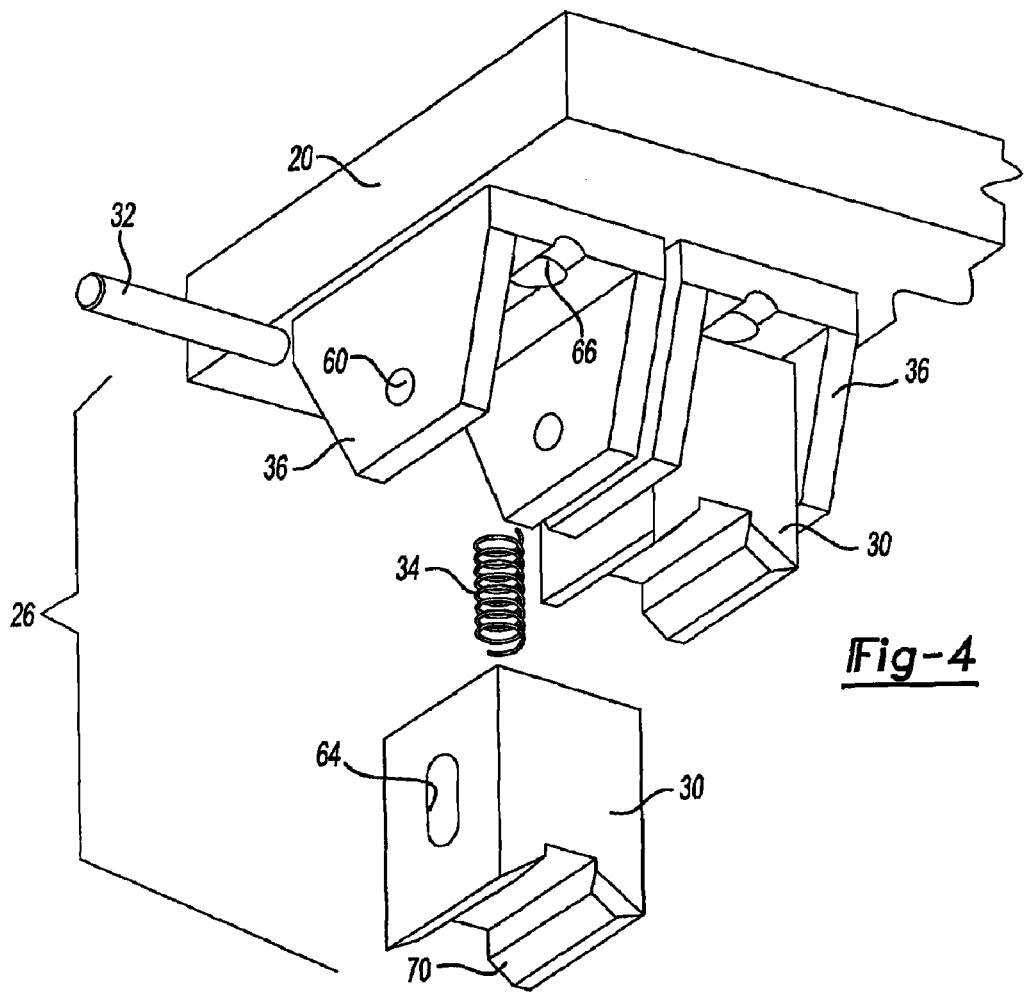
FIG. 4 is an exploded, perspective view of a floating V-block made in accordance with one embodiment of the present invention.

Referring to FIG. 4, the structure and function of the upper V-block assembly 26 is described in greater detail. It should be understood that the lower floating clamp assembly 28 has the same structure and function as the upper V-block assembly 26. The upper V-block assembly 26 is assembled to the top plate 20. In FIG. 4, two V-block retainers 36 are shown secured to the top plate 20. One jaw 30 is shown oriented ready for assembly to the V-block retainer 36 with a second jaw 30 being shown assembled to the V-block retainer 36. The spring 34 is received in the spring seat 66 that is formed in the V-block retainer 36. Dowel 32 extends through the dowel holes 60 formed in the V-block retainer 36. Dowel 32 also extends through the slot 64 formed in the jaw 30. The locating face 70 of the jaw 30 is oriented to engage an outer surface 70 of the end 74 of the bearing cap 12, as previously described.

Figure 5:
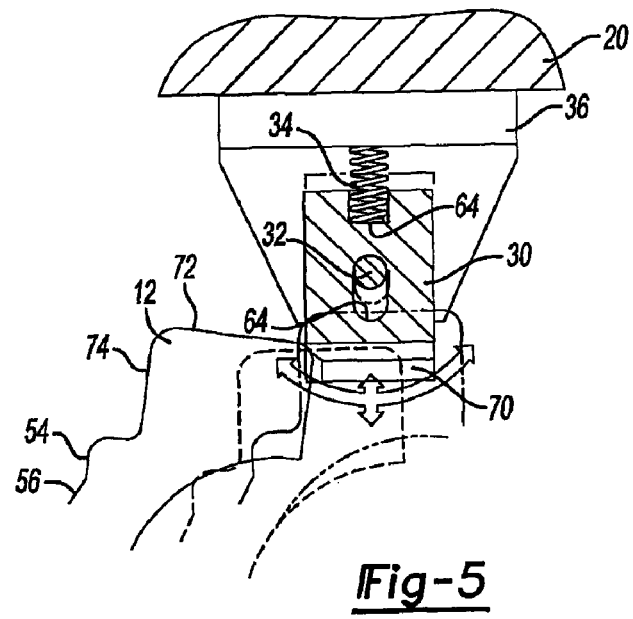
FIG. 5 is a diagrammatic cross-sectional view showing the degrees of freedom of movement of the floating V-block.

Referring to FIG. 5, the movable mounting arrangement of the jaw 30 is shown to illustrate the available degrees of freedom of movement of the jaw 30. The V-block retainer 36 is secured to the top plate 20. The jaw 30 is secured to the V-block retainer 36 by the dowel 32. The circular dowel 32 allows for limited rotational movement of the jaw 30 relative to the V-block retainer 36. Longitudinal or vertical movement of the jaw 30 is permitted by means of the elongated slot 64 formed in the jaw 30. When the bearing cap 12 is initially inserted into the fixture, the outer surface 72 of the bearing cap 12 is received by the locating face 70 of the jaw 30. The jaw 30 may move rotationally and vertically to accommodate variations in the bearing cap 12. The jaws 30 initially retain the bearing cap 12 adjacent the mandrel 22. Spring 34 provides a biasing force against the outer surface 72 of the bearing cap 12.

Figure 6:
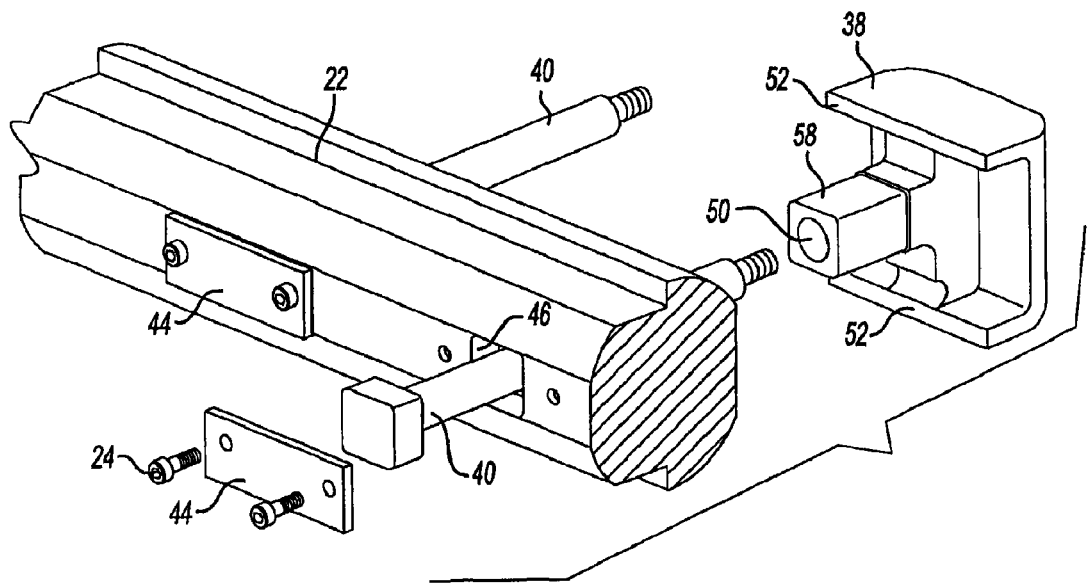
FIG. 6 is a fragmentary exploded, perspective view of a mandrel and a clamp according to one aspect of the present invention.

Referring to FIG. 6, the mandrel 22 and mandrel clamp 38 are illustrated to show how the mandrel clamps 38 are secured to the mandrel 22. The mandrel 22 has bolt head receptacles 46 that receive the head of the tie-down bolt 40 so that it cannot rotate after insertion into the bolt head receptacle 46. The tie-down bolt 40 is held in the mandrel 22 by backing plate 44 that is secured by bolts 24 to the mandrel 22. As shown in FIG. 6, one tie-down bolt 40 is shown secured within the mandrel and a second tie-down bolt 40 is shown partially assembled to the mandrel 22 with the backing plate 44 being oriented for assembly to the mandrel 22.

As shown in FIG. 6, the mandrel clamp 38 is oriented for assembly to the tie-down bolt 40. The mandrel clamp 38 has locating fingers 52 that are oriented to engage a step 54 on the bearing cap 12. A central opening 50 is formed in the mandrel clamp 38 that extends through the tubular extension 58 of the mandrel clamp 38. The tie-down bolt 40 receives the mandrel clamp 38 so that the tie-down bolt extends through the central opening 50.

Figures 7, 8:
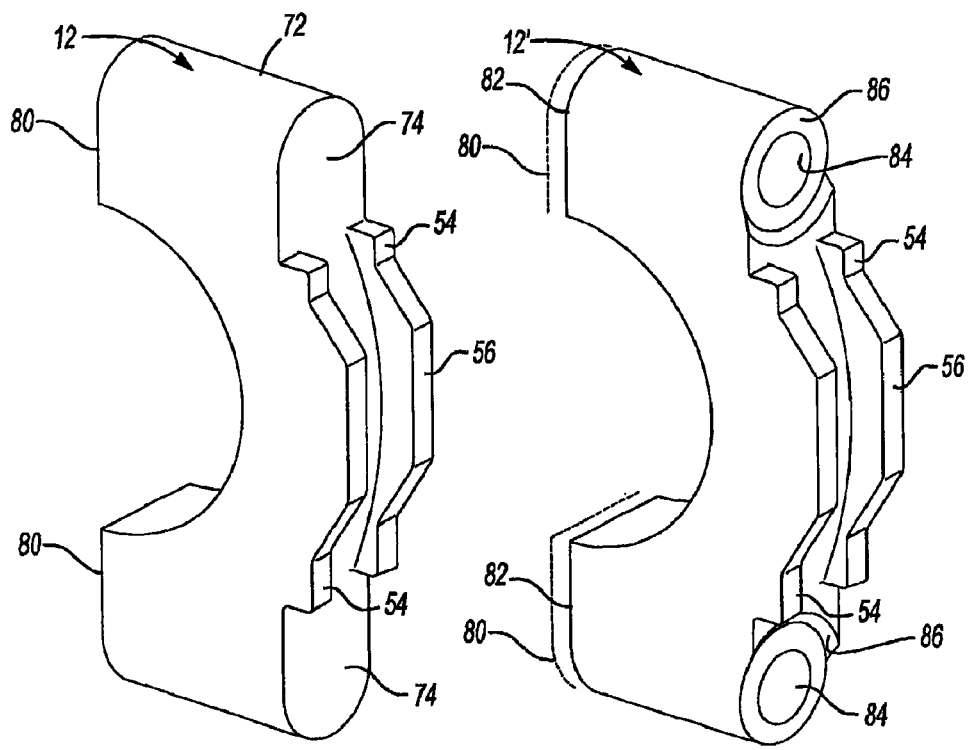
FIG. 7 is a perspective view of a cast, unmachined bearing cap.
FIG. 8 is a perspective view of a partially machined bearing cap.

Referring to FIG. 7, a bearing cap 12 is shown in its as cast configuration. The bearing cap 12 includes a reinforcing rib 56 on which a step 54 is formed that is engaged by the locating fingers 52 of the mandrel clamp 38. Two faces 74 are cast on opposite ends of the bearing cap 12. Outer surfaces 72 of the bearing cap 12 engage the locating face 70 of each of the jaws 30. Machine stock 80 is provided on the bearing cap 12 that is machined in the CNC work center with a face mill, or the like, to form a machined parting line 82. The bolt shoulders 74 are also machined while on the fixture with a bolt hole 84 being formed through the bolt shoulder 74. A counterbore 86 is formed on the bolt shoulder 74 to provide a machined surface that is concentric with the bolt hole 84 on the opposite side of the bearing cap 12 from the cast parting line 80. The bolt hole 84 and counterbore 86 may be formed in a single step with an appropriate combination drill.

Referring to FIG. 8, a machined bearing cap 12' is illustrated. The machined bearing cap 12' is machined with the mill from the cast parting line 80 to the desired machined parting line 82. The machined bearing cap 12' is also machined on the opposite side from the parting line by drilling a bolt hole 84 through the bolt shoulder 74 and by counterboring the counterbore 86.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a bearing cap comprising:
    selecting an as cast pair of bearing caps, each bearing cap defining a semi-cylindrical bearing bore and an outer surface;
    assembling each bearing cap into a first fixture, the first fixture having a mandrel that is received in each semi-cylindrical bearing bore;
    clamping the bearing caps into the first fixture with clamps that engage the outer surfaces of the bearing caps and wherein the clamping step further includes the step of securing a clamping element to the mandrel with a link that is disposed between the pair of bearing caps;
    machining a pair of bolt shoulder portions of each bearing cap after clamping the bearing caps onto the first fixture;
    drilling a bolt hole in each bolt shoulder portion of each bearing cap after the step of clamping the bearing caps onto the first fixture;
    removing the bearing caps from the first fixture; and
    machining the bearing bore after drilling the bolt holes with the bearing caps being located based upon the location of the bolt holes to form the finished bearing caps.

2. The method of claim 1 wherein the step of clamping the bearing caps onto the first fixture further comprises inserting each bearing cap into spring biased end clamps that engage first and second ends of the bearing cap.

3. The method of claim 1 wherein the step of drilling a bolt hole in each bolt shoulder portion is performed after the step of machining the bold shoulder portions.

* * * * *